Oct. 6, 1959     E. A. McCASKILL     2,907,380
TIRE MOUNTING METHOD AND MEANS
Filed March 11, 1957
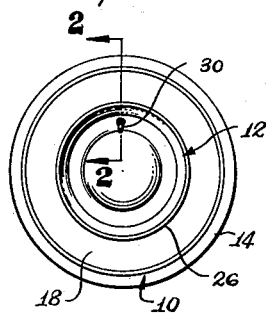
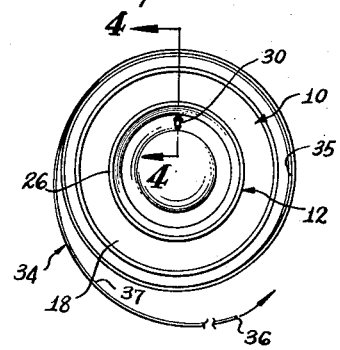
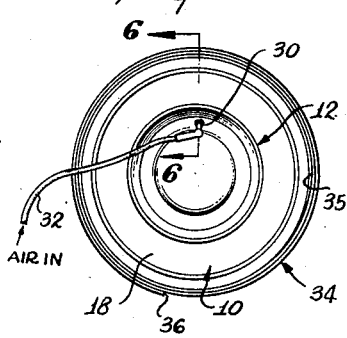
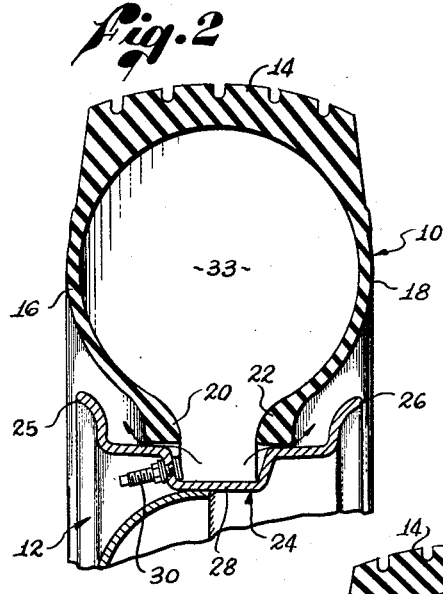
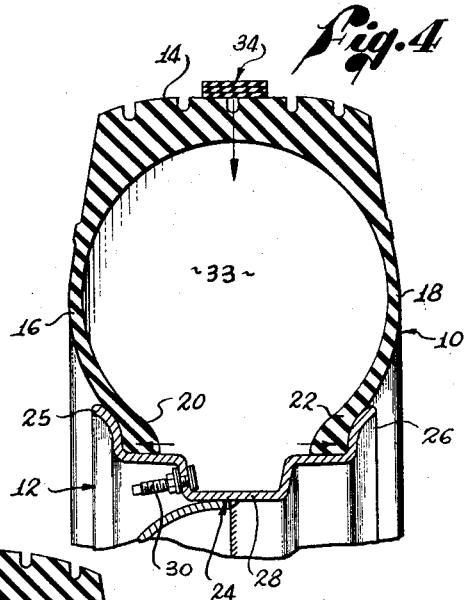
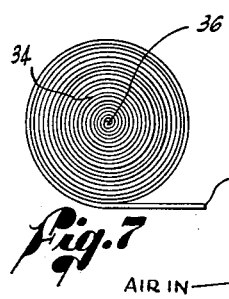
INVENTOR.
EARL A. McCASKILL

United States Patent Office 2,907,380
Patented Oct. 6, 1959

2,907,380

TIRE MOUNTING METHOD AND MEANS

Earl A. McCaskill, Encino, Calif.

Application March 11, 1957, Serial No. 645,314

3 Claims. (Cl. 157—1.21)

My invention relates generally to a tire-mounting method and means and more particularly to a method and means for mounting pneumatic tubeless tires.

It has previously been proposed to mount a pneumatic tire upon a wheel without using an inner-tube to confine the air. Because such tubeless tires obviate the need for an inner-tube, they have come into widespread use in the automotive industry. However, a problem is encountered in mounting tubeless tires upon wheels. The problem arises due to the difficulty of uniformly bringing the beads of the tire into engagement with the rim of the wheel. Such engagement or seating is necessary to shape the tire so that it will act in conjunction with the rim to confine air, and enable a positive pressure to be developed inside the tire. The positive pressure, once developed, exerts a force to seal the tire to the rim.

It has previously been proposed to utilize various mechanical apparatus for distorting the rim and thereby form a somewhat airtight seal prior to inflating the tire. Such apparatus, however, in general does not uniformly distort the tire because it does not exert a force which is uniformly distributed about the tire. As a result, mechanical apparatus for distorting a tire to enable mounting upon a rim has not entirely solved the problem of mounting tubeless pneumatic tires. Additionally, mechanical and other prior apparatus for use in this function have been expensive to manufacture.

My invention contemplates a method and means for mounting a pneumatic tubeless tire by distorting the tire with a uniformly distributed force, exerted about the tire, to thereby bring the beads of the tire into engagement with the rim of the wheel. The uniform force is exerted upon the tire by a strip of elastic material manually, or otherwise, wrapped around the periphery, i.e., tread portion, of the tire. The strip is stretched as it is applied, by a force exerted tangentially to the circumference of the tire. The elastic strip thus wrapped upon the tire then exerts a distributed force acting inwardly around the outer periphery of the tire to thereby distort the tire to bring the beads of the tire into engagement with the rim of the wheel enabling inflation of the tire.

It is therefore a major object of my invention to provide an improved tire-mounting method and means which is economical to manufacture.

Another object of my invention is to provide a method of manually mounting pneumatic tubeless tires upon wheels which requires less physical effort and greatly facilitates mounting the tires on the wheels.

A further object of my invention is to provide a method of mounting tubeless pneumatic tires upon wheels, wherein a distributed force is exerted about the periphery of a tire to thereby uniformly distort the tire and greatly facilitate the mounting thereof.

A still further object of my invention is to provide a tire-mounting means which may be manually operated to apply a distributed force to a tire and thereby facilitate mounting the tire.

These and other objects and advantages of my invention will become apparent from the following specification and accompanying drawings, in which:

Figure 1 is a perspective view of a tubeless tire positioned upon a wheel;

Figure 2 is an enlarged vertical sectional view taken along line 2—2 of Figure 1;

Figure 3 is a perspective view of a tire partially mounted upon a wheel, shown at one stage of mounting in accordance with the principles of my invention;

Figure 4 is an enlarged vertical sectional view taken along the line 4—4 of Figure 3;

Figure 5 is a perspective view of a tire shown completely mounted upon a wheel in accordance with the principles of my invention;

Figure 6 is an enlarged vertical sectional view taken along the line 6—6 of Figure 5; and Figure 7 is a perspective view of means for mounting a tire upon a wheel in accordance with the principles of my invention.

Referring now to the drawing, the described form of method and means for mounting a tire in accordance with my invention is illustrated with regard to a tire 10 and a wheel 12. The tire 10 is of the tubeless pneumatic type normally used in the automotive industry for passenger automobiles and trucks. The external periphery of the tire 10 is formed into a tread 14 which bears upon the road when the tire is in use. In the formation of the tire 10, the tread 14 is connected by side walls 16 and 18 to beads 20 and 22, respectively. The beads 20 and 22 are normally formed as annular relatively inflexible portions of the tire, and commonly include steel wire or other material to increase their rigidity.

The wheel 12 includes a rim 24 having side wall flanges or rim sides 25 and 26 formed integral with an annular section 28 to form the composite rim. A valve stem 30 is mounted in the rim 24 and is adapted to be connected to an air hose 32 for passing air or other gas into the cavity 33 formed by the tire and wheel in combination. In this manner, a pressure may be developed in the cavity 33 which will support a load placed on the wheel and tire in combination.

In mounting a tire upon a wheel in accordance with my invention, sections of a strip 34 of elastic material are placed in tension and applied to the tread 14 of the tire 10. The strip 34 is thus wrapped in a stretched condition about the tire 10 in a somewhat overlapping relationship. Thus the end 35 of the strip is held upon the tire by the first encirclement of the strip 34. The end 36 of the strip 34 is normally not affixed or attached to the tire during the mounting process, but is simply held to prevent the strip from falling off the tire 10.

The strip 34 may be formed of synthetic rubber having a thickness of some $\frac{1}{16}$ inch. Satisfactory strips of such thickness and material have been formed to a size of approximately fourteen feet in length and approximately one inch in width. Such a length is normally adequate to mount heavier tires of the type used on trucks. The cross-section of the strip 34 is rectangular to enable the strip to lie flat on the tread 14 and facilitate overlapping during winding. Of course, the cross-sectional size of the strip will depend upon the resiliency of the material used. For manual use, the strip should be formed to enable manual stretching without great effort.

According to the present practice of mounting a tubeless pneumatic tire, the tire 10 is positioned upon the rim 12, as shown by Figures 1 and 2. If an air hose is then connected to the valve stem 30 in the wheel 12, with the tire in its natural shape, as shown in Figures 1 and 2, air passing into the cavity 33 passes between the beads 20 and 22 and the rim 24, leaving the tire deflated. Therefore, prior to inflation of the tire 10, it is necessary to spread or distort the tire so that the beads 18 and 22 are forced to a position contiguous to the rim sides 25 and 26, respectively, thereby closing the passage between these members to render the cavity 33 somewhat air-tight. The manner of distorting the tire 10 to effect a uniform engagement between the beads, e.g., 20, and the rim 24, has previously presented an extremely perplexing problem for which no apparent satisfactory solution has been advanced.

According to my invention, with a tire 10 mounted upon a wheel 12, as shown in Figures 1 and 2, one end 35 of the strip 34 is held upon the tread 14. Normally, the strip will be positioned in the center of the tread 14. A section 37 is next pulled in a direction substantially tangential to the periphery of the tire 10, that is, along the tread 14. The strip 34 is then wrapped, e.g., manually, in tension, about the tread 14 to encompass the tire 10. After one complete revolution of the strip 34, the end 35 of the strip is covered and thereby held upon the tread 14. After a revolution or so is made around the tread 14 by the strip 36, the tire 10 will be slightly distorted so that the beads 20 and 22 are urged nearly into contact with the rim 34, e.g., at the sides 25 and 26, respectively, as shown in Figure 4. A single turn of the strip 34 will seldom exert a sufficient force on the tire 10 to enable inflation of the tire. Therefore, a force is again exerted upon a section 37, where the strip 34 leaves the tire 10, to stretch the strip 34, and it is further wrapped about the tread 14. Ordinarily, a minimum of three turns of the strip 34 about the tire 10 are required to properly distort the tire; however, several more turns may be necessary in mounting heavy tires. It is to be noted, that as the strip 34 is wrapped about the tire 10 in the aforedescribed fashion, the compressive force exerted by the strip 34 against the tread 14 of the tire 10 is distributed around the periphery of the tire. This distribution of force results from the use of an elastic material in the strip 34, and serves to uniformly distort the tire 10. That is, the elastic strip 34 tends to distribute its elastic force and thereby uniformly spread the tire 10.

As a result of the distributed force exerted around the periphery of the tire 10 by the strip 34, the side walls 16 and 18 are uniformly flexed outwardly. The outward flexure of the side walls 16 and 18 of the tire 10 urges the beads 20 and 22 to a position contiguous to the sides 25 and 26, and into positive engagement with the rim as shown in Figures 5 and 6. It is to be noted that the engagement of the beads 20 and 22 with the rim 24 is uniform around the periphery of the wheel 12 because the compressive force exerted by the strip 34 on the tread 14 of the tire is substantially uniformly distributed around the periphery or tread of the tire.

With the tire 10 flexed or distorted as in the manner shown in Figures 5 and 6, the air hose 32 is connected to the valve stem 30 to pass air into the cavity 33 under pressure. With the beads 20 and 22 in sealing contact with the rim 24, the cavity 30 is rendered air-tight and therefore a positive pressure is developed in the cavity 33. When the pressure in the cavity 33 reaches a few pounds per square inch, the forces exerted by such pressure on the side walls 16 and 18 will maintain the beads 20 and 22 tightly urged against the rim sides 25 and 26. However, the tire will normally be inflated to the pressure at which it is to be used, prior to removing the strip 34. When the tire 10 has been so inflated with air or other fluid, the strip 34 is removed from the tire thereby completing the mounting operation.

It will therefore be seen that my invention provides a greatly improved method and means for mounting pneumatic tubeless tires. It is of particular importance that in using the strip 34, a uniform force is exerted around the periphery of the tire 10. It is this uniform distribution of force which results from the use of my means, e.g., the strip 34, which renders my method of mounting tires a considerable advance in the art. Importance is also to be attached to the fact that the strip 34 may be manufactured very economically and used manually.

The strip 34 may be stored in a condition ready for use as shown in Figure 7. The strip is simply rolled up so that the end 35 may be laid upon a tire tread. As the strip 34 is unrolled it may be stressed and applied to the tire in accordance with my invention.

Various modifications and changes may be made with respect to the foregoing detailed description without departing from the spirit of my invention or the scope of the following claims.

I claim:

1. A method of securing a tubeless pneumatic tire having beads to a wheel having rim sides comprising: positioning the tire upon said wheel with its beads positioned between said rim sides; positioning one end of an elastic rubber-like strip on the outer periphery of said tire; stretching a portion of said elastic strip and applying said portion to encircle the periphery of said tire; pulling on a similar contiguous portion of said strip not applied to said tire, to place it in a stretched condition; applying said contiguous portion of the strip to the periphery of said tire; and passing air into said tire to develop a pressure for urging the beads against said rim sides.

2. A method of securing a tubeless pneumatic tire having beads to a wheel having rim sides comprising: positioning the tire upon said wheel with its beads positioned between said rim sides; positioning one end of an elastic rubber-like strip on the outer periphery of said tire; repeatedly stretching sections of said rubber-like elastic strip and applying said sections in tension to the periphery of said tire to thereby encircle said tire a multiplicity of times with each circumferential strip being compressed against a corresponding circumferential strip, so that said tire is thereby distorted in such a manner that said beads are urged against said rim sides; and passing air into said tire to develop a pressure for urging the beads against said rim sides.

3. A method of securing a tubeless pneumatic tire having beads to a wheel having rim sides comprising: positioning the tire upon said wheel with its beads positioned between sad rim sides; positioning one end of an elastic rubber-like strip on the outer periphery of said tire; repeatedly stretching sections of the elastic strip with a manually exerted force and applying said sections in tension to the periphery of said tire to thereby repeatedly encircle said tire a multiplicity of times with each circumferential strip being compressed against a corresponding circumferential strip, whereby said strip exerts a distributed force to distort said tire whereby said beads are uniformly positioned contiguous to said rim sides; and creating a positive pressure within said tire to urge said beads against said rim sides.

References Cited in the file of this patent

UNITED STATES PATENTS

| | | |
|---|---|---|
| 1,078,088 | Edwards | Nov. 11, 1913 |
| 1,714,016 | Gammeter | May 21, 1929 |
| 1,966,580 | Bull | July 17, 1934 |
| 2,316,157 | Eschner | Apr. 13, 1943 |
| 2,444,903 | Van Buren | July 6, 1948 |
| 2,799,328 | Pitman | July 16, 1957 |